United States Patent [19]
Kelly et al.

[11] 3,728,377
[45] Apr. 17, 1973

[54] 4,4-BIS(ALKOXYCARBONYL)BENZOIN ETHERS

[75] Inventors: Charles A. Kelly; James G. Pacifici, both of Kingsport, Tenn.

[73] Assignee: Eastman Kodak Company, Rochester, N.Y.

[22] Filed: June 5, 1972

[21] Appl. No.: 260,702

[52] U.S. Cl. .......................260/473 R, 204/159.23
[51] Int. Cl. ............................................C07c 69/78
[58] Field of Search ...........................260/520, 473 R

[56] References Cited

UNITED STATES PATENTS 2,448,828   9/1948   Renfrew..............................204/162

Primary Examiner—Lorraine A. Weinberger
Assistant Examiner—John F. Terapane
Attorney—Cecil D. Quillen, Jr. et al.

[57] ABSTRACT

Disclosed are certain novel 4,4'-bis(alkoxycarbonyl)benzoin ethers which have the formula

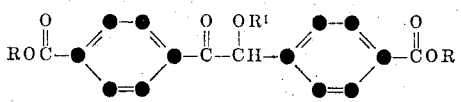

and which are useful as photoinitiators of polymerization, e.g., in the formation of coatings and thin films. The novel 4,4'-bis(alkoxycarbonyl)-benzoin ethers are prepared by contacting aldehydes of the formula

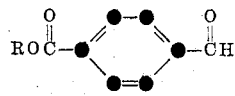

with a cyanide catalyst to form 4,4'-bis(alkoxycarbonyl)benzoins of the formula

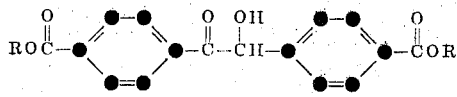

and by reacting such 4,4'-bis(alkoxycarbonyl)benzoins with an alcohol of the formula $R^1OH$ to form a 4,4'-bis(alkoxycarbonyl)benzoin ether of the foregoing formula. Each of R and $R^1$ are straight or branched chain alkyl of one to 10 carbon atoms.

6 Claims, No Drawings

4,4-BIS(ALKOXYCARBONYL)BENZOIN ETHERS

This invention relates to certain novel chemical compounds and to a process for their preparation. The novel compounds of our invention are 4,4'-bis(alkoxycarbonyl)benzoin ethers which have the formula

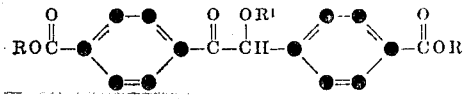

in which the substituents R may be the same or different and are straight or branched chain alkyl of 1–10 carbon atoms, and the substituent $R^1$ is straight or branched chain alkyl of 1–10 carbon atoms.

Our novel compounds are useful as photosensitizers for photopolymerizable systems and unexpectedly have the ability to cause polymerization of such systems at faster rates than do other compounds which previously have been used as polymerization initiators for such systems.

The novel compounds of our invention can be prepared from aldehydes of the formula

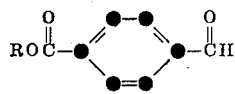

in which R is as defined hereinbefore in a two-step process which comprises contacting at least one aldehyde of the foregoing formula with a cyanide catalyst to form at least one 4,4'-bis(alkoxycarbonyl)benzoin of the formula

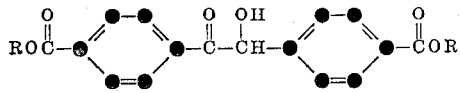

and then reacting such 4,4'-bis(alkoxycarbonyl)benzoin with an alcohol of the formula

wherein $R^1$ is as defined above to obtain at least one 4,4'-bis(alkoxycarbonyl)benzoin ether of the formula

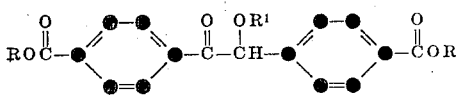

Aldehydes according to the formula

which are useful in the process of our invention include methyl p-formylbenzoate, ethyl p-formylbenzoate, propyl p-formylbenzoate, butyl p-formylbenzoate, pentyl p-formylbenzoate, hexyl p-formylbenzoate, heptyl p-formylbenzoate, octyl p-formylbenzoate, nonyl p-formylbenzoate, decyl p-formylbenzoate, etc. Preferred among these aldehydes are those in which the substituent R is lower alkyl of 1–4 carbon atoms, e.g., methyl, ethyl, propyl, isopropyl, butyl, sec-butyl, tert-butyl, isobutyl.

In the first step of the process of our invention one or more aldehydes of the formula

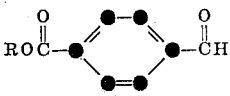

are contacted with a cyanide catalyst to form at least one compound of the formula

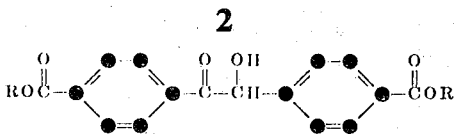

In the event two or more different aldehydes are contacted with the cyanide catalysts, then three or more different compounds of the formula

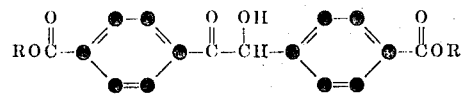

will be obtained. For example, when a mixture of methyl p-formylbenzoate and ethyl p-formylbenzoate are contacted with a cyanide catalyst the resulting products are 4,4'-bis(methoxycarbonyl)benzoin, 4,4'-bis(ethoxy-carbonyl)benzoin, and 4-ethoxycarbonyl-4'-methoxycarbonylbenzoin.

The contacting of the aldehyde with the cyanide catalyst is preferably carried out in the liquid phase in a solvent. Preferred solvents are the lower alcohols, e.g., alcohols having one to four carbon atoms with methanol and ethanol being especially preferred as reaction solvents. The reaction is typically carried out in the liquid phase, i.e., at a temperature between the freezing point and boiling point of the reactions solvent. In one preferred technique, the aldehyde is first contacted with the cyanide catalyst at a comparatively low temperature, e.g., about 5°C and the reaction mixture is subsequently heated under reflux. In another technique the aldehyde is contacted with the cyanide catalyst at ambient temperature, e.g., about 20°C, and the reaction mixture is allowed to stand until the reaction is completed. In a technique which is especially useful in operations on a commercial scale, a solution of the aldehyde, e.g., an alcoholic solution thereof, is mixed with an alcoholic solution of the cyanide catalyst. The rate of mixing of the two solutions is controlled so as to prevent an excessively high rise in temperature on account of the exothermic nature of the reaction which occurs.

Cyanide catalysts which are useful in the first step of the process of our invention are those which heretofore have been used as catalysts for the benzoin condensation. See Gutsche, The Chemistry of Carbonyl Compounds, Prentice Hall, Englewood Cliffs, N. J. (1967), page 93 and Cram and Hammond, Organic Chemistry (Second Edition), McGraw Hill, page 312. Because of their ready availability, alkali metal cyanides such as sodium cyanide and potassium cyanide are preferred for use by us.

In the second step of the process of our invention, a 4,4'-bis(alkoxycarbonyl)benzoin is reacted with an alcohol to form a 4,4'-bis(alkoxycarbonyl)benzoin ether. The 4,4'-bis(alkoxycarbonyl)benzoins which are useful are those obtained in accordance with the first step of the process of our invention, i.e., those in which the alkoxy groups are the same or different and contain one to 10 and preferably one to four carbon atoms. The alcohols which are useful in the second step of the process of our invention are those monohydric, straight or branched chain, primary, secondary or tertiary alcohols which contain one to 10, preferably one to four carbon atoms. Typical of the alcohols which are preferred for use in the second step of the process of our invention are methanol, ethanol, propanol, isopropanol, butanol, isobutanol, sec-butanol, and tert-butanol.

The second step of the process of our invention is conveniently carried out using the alcohol to be reacted with the 4,4'-bis(alkoxycarbonyl)benzoin as the reaction medium. The reaction is carried out with the aid of a strong acid which functions as a dehydrating agent. Typical of the strong acids which are useful include hydrochloric acid (including hydrogen chloride), sulfuric acid, p-toluene sulfonic acid, chlorosulfonic acid, etc. The amount of acid used should be sufficient to insure that the reaction achieves the desired degree of completion.

carried reaction between a 4,4'-bis(alkoxycarbonyl)benzoin and the alcohol to form a 4,4'-bis(alkoxycarbonyl)benzoin ether typically is carrier out at a temperature between ambient temperature and the reflux temperature of the reaction mixture. However, higher or lower temperatures can be employed if desired. If desired, the reaction can be carried out in such a way that the water of reaction is removed as it is formed, e.g., by using a Dean-Stark trap and xylene as a water entrainer.

Ester interchange between the alcohol and the alkoxy group of the alkoxy carbonyl substituent of the 4,4'-bis(alkoxycarbonyl)benzoin can be accomplished by conducting the second step of the process of our invention under more severe reaction conditions, e.g., at the refluxing temperature of the reaction mixture. If ester interchange is to be avoided, milder reaction conditions, e.g., ambient temperature, can be employed.

The following examples illustrate the preparation of compounds according to our invention.

EXAMPLE 1

A. 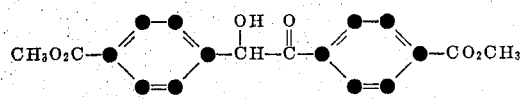

A stirred solution of 164 g. (1.0 mole) of distilled methyl p-formylbenzoate in 500 ml. of methanol is cooled to 5°C. and 5.0 g. of potassium cyanide is added. After stirring for 10 min., the cooling bath is removed. The solution turned red and a solid precipitates. An additional 300 ml. of methanol is added to facilitate stirring. After 1 hr. the solution is refluxed for 15 min. and cooled. The product is collected by filtration, washed with 200 ml. of methanol, slurried with 300 ml. of methanol, filtered and dried to give 143 g. (88%) of methyl p-[α-hydroxy-p-(methoxycarbonyl)benzyl]carbonylbenzoate, hereinafter referred to as 4,4'-bis(methoxycarbonyl)-benzoin, as a white solid, m.p. 141°-143°C. Anal. Calcd. for $C_{18}H_{16}O_6$: C, 65.85; H, 4.9. Found: C, 65.4; H, 4.9.

B. 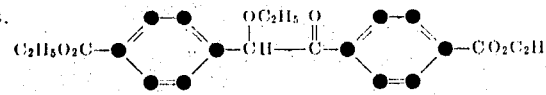

A mixture of 10 g. (0.03 mole) of 4,4'-bis(methoxycarbonyl)-benzoin in 50 ml. of ethanol is stirred and heated to reflux. Five grams of anhydrous hydrogen chloride is added over a period of 10 min. and reflux is continued for 3 hr. The ethanol is removed by a rotary evaporator and the residue dissolved in 50 ml. of benzene, washed with 40 ml. of water, 40 ml. of 5 percent aqueous sodium carbonate solution and 40 ml. of water, and finally dried over anhydrous magnesium sulfate. The benzene is removed by a rotary evaporator to give 11.0 g. (96 percent) of ethyl p-[α-ethoxy-p-(ethoxy carbonyl)-benzene]carbonyl benzoate, hereinafter referred to as 4,4'-bis(ethoxycarbonyl) benzoin ethyl ether, as a light yellow, viscous oil.

EXAMPLE 2

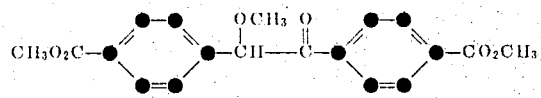

To a solution of 300 g. of anhydrous HCl in 300 g. of methanol is added with stirring 30 g. (0.09 mole) of 4,4'-bis(methoxycarbonyl)benzoin prepared in accordance with Example 1A. The resulting slurry is stirred for 16 hr. at ambient temperature. A stream of nitrogen is passed through the mixture for 15 min. to remove HCl. The insoluble white solid present is removed by filtration and dried to give 6.5 g., m.p. 290°C. This material was identified as the dimer of the desired product. Anal. Calcd. for $C_{38}H_{36}O_{12}$; C, 66.7; H, 5.3; mol. wt., 684. Found: C, 66.2; H, 5.3; mol. wt. 670. The filtrate is evaporated to give 25 g. of a viscous, light yellow residue that solidifies on cooling. This material is recrystallized from methanol to give 23 g. (75 percent) of 4,4-bis(methoxycarbonyl)benzoin methyl ether, m.p. of 87°-88°C. Anal. Calcd. for $S_{19}H_{18}O_6$: C, 66.7; H, 5.3. Found: C, 66.3; H, 5.3.

EXAMPLE 3

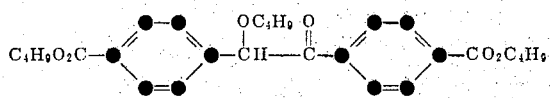

To a slurry of 32.8 g. (0.1 mole) of 4,4'-bis(methoxycarbonyl)-benzoin in 200 g. of butanol at 80°C. is added 21 g. of anhydrous HCl. The temperature rises to 95°C. during the addition and a homogenous solution results. The reaction solution is stirred and heated at 95°-98C. for 2½ hr., and then cooled to 40°C. and washed with 150 ml. of 20 percent aqueous sodium chloride solution, and then 100 ml. of water, and dried over magnesium sulfate. The excess butanol is removed in vacuo to give 36 g. (95 percent) 4,4'-bis(butoxycarbonyl)benzoin butyl ether. The n.m.r. spectrum confirms the identity of this material.

EXAMPLE 4

A mixture of 10 g. (0.03 mole) of 4,4'-bis(methoxycarbonyl)-benzoin, 100 g. of butanol, 50 ml. of xylene, and 2 g. of p-toluenesulfonic acid is refluxed for 9 hr. under a Dean-Stark water trap. The mixture is cooled, washed with 50 ml. of water, 50 ml. of 5 percent aqueous sodium bicarbonate solution, 50 ml. of water, and dried over sodium sulfate. The volatile components are removed in vacuo to give 13 g. (98 percent) of 4,4'-bis(butoxycarbonyl)benzoin butyl ether, containing about 12 percent 4,4'-bis(butoxycarbonyl)benzoin.

EXAMPLE 5

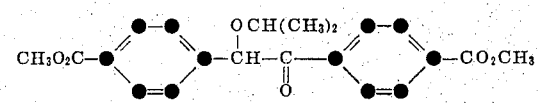

To a slurry of 30 g. (0.09 mole) of 4,4'-bis(methoxycarbonyl)-benzoin in 800 ml. of isopropanol is added dry HCl at 45°–50°C. for 3 hr. The reaction solution is allowed to stand at 25°C. for 16 hr. Nitrogen is passed into the solution to expel the HCl, and the remaining volatile materials are removed in vacuo to leave a viscous residue that crystallizes on cooling. Recrystallization from methanol gives 12 g. (37 percent) of 4,4'-bis(methoxycarbonyl)benzoin isopropyl ether m.p. 75°–76C.

EXAMPLE 6

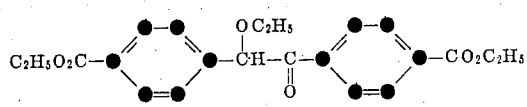

A stirred slurry of 200 g. (0.61 mole) of 4,4'-bis(methoxycarbonyl)benzoin in 2,000 ml of absolute ethanol was heated to reflux. The heating mantle was removed and 600 g. (5.2 mole) of chlorosulfonic acid was added dropwise over a period of 35 min. The reaction was exothermic and the addition was regulated so that a gentle reflux was maintained. The mixture became homogeneous, and the solution was refluxed for an add 3½ hr. The solution was cooled to 30°C. and the solvent removed in vacuo on a thin film evaporator at temperature less than 90°C. The residue was diluted with 1,000 ml. of toluene and the mixture washed 2 times with 300 ml. of water, followed by 200 ml. of 5 percent sodium bicarbonate solution and finally with 200 ml. of water. The solution was treated with 15 g. Nuchar C-190N, filtered, and dried over magnesium sulfate. The solvent was removed in vacuo by a thin film evaporator to give 218 g. (95 percent) of 4,4'-bis(ethoxycarbonyl)benzoin ethyl ether as a yellow viscous oil.

Our novel compounds are especially useful in the formation of a coatings from polymerizable unsaturated liquid materials. Coatings of this type are becoming especially important because their use minimizes atmospheric emissions since such coating materials need not contain volatile solvents.

Coating systems that may be cured using our novel photosensitizers are quite varied and include polymerizable unsaturated organic compounds and mixtures of such compounds. Some specific compounds that are preferred in such coating systems include acrylic, α-alkyl acrylic, and α-chloroacrylic acid compounds such as esters, amides and nitriles, e.g., acrylonitrile, methacrylonitrile, ethyl acrylate, methyl methacrylate, isobutyl methacrylate, acrylamide, methacrylic acid, methyl α-chloroacrylate. Also included are vinyl and vinylidene esters, ethers, ketones, e.g., vinyl acetate, vinyl chloride, vinylidene chloride, methyl vinyl ketone. In addition included are hydrocarbons such as styrene. In addition, compounds having more than one terminal unsaturation can be used. These include: ethylene glycol diacrylate, methacrylic anhydride, divinylbenzene. Unsaturated polyesters such as thos derived from unsaturated acid, e.g., fumaric and maleic acids, with glycols, e.g., ethylene glycol, propylene glycol, neopentyl glycol, 1,4-butanediol. Such polymerizable compositions can contain from 0.1 to 5 percent by weight of our novel photosensitizer materials. Mixtures of photosensitizers can also be used. The photosensitizer may be added immediately before exposure to the ultraviolet curing process or at any time prior to this. Coating compositions containing our novel photosensitizers show good storage stability and do not cause preliminary gelation in storage.

Compositions containing our photosensitizers may be polymerized or cured by irradiation with actinic light in the range of 250 to 500 nm. Sources of such light include sunlight, mercury arcs and sunlamps. The rate of polymerization is dependent upon the intensity of the light and also upon the concentration of the photosensitizer.

The following Example illustrates the use of certain of the compounds of our invention as well as a compound disclosed in U. S. Pat. No. 2,448,828 as photoinitiators for film-forming compositions.

EXAMPLE 7

Weighed quantities of photoinitiator are mixed with a styrenated unsaturated polyester with the following composition: neopentyl glycol ester with isophthalic acid-maleic anhydride in a 1:1 molar ratio - containing 35% styrene monomer. Concentrations of sensitizer are 0.5 and 1.0% (w/w). The curable compositions are coated 4 to 6 mil thickness on Parker Test Panels (cold rolled steel, 3-in. × 9-in. × 20 gauge; Bonderite 37 treatment, Hooker Chemical Corp., Parker Division, Detroit, Michigan). The coated panels are then passed under a Corex-filtered 250-watt General Electric medium pressure mercury arc (black-panel temp. 70°C.); the distance from the arc is 6 cm. and the rate of passage is 1 ft./min. Hardness of the cured coating is evaluated by a standard pencil hardness test National Coil Coaters Assoc., Practical Bulletin No. II-12). The results are as follows:

| Compound | Wt. Added, % | Hardness |
| --- | --- | --- |
| 1. None | — | <6B |
| 2. Benzoin methyl ether (U.S. Pat. No. 2,448,828) | 0.5 | 1B |
|  | 1.0 | 1H |
| 3. 4,4'-bis(methoxycarbonyl)benzoin methyl ether | 0.5 | 1H |
|  | 1.0 | 2H |
| 4. 4,4'-bis(ethoxycarbonyl)benzoin ethyl ether | 0.5 | 1B |
|  | 1.0 | 1H |
| 5. 4,4'-bis(butoxycarbonyl)benzoin ether | 0.5 | 1B |
|  | 1.0 | 1H |

The novel compounds of our invention, because of their ability to absorb ultraviolet radiation, are useful as initiators of photopolymerization. Because they absorb such radiation at an unexpectedly high rate, the compounds of our invention are capable of initiating polymerization of coatings and films at a faster cure rate than an equal quantity of prior art compounds which can be used for the same purpose. In the alternative a smaller quantity of one of our compounds can be used to achieve a cure rate equal to that achieved by a larger quantity of prior art compound.

The following example compares the absorptivity of one of the compounds of our invention with the absorptivity of one of the compounds described as a photopolymerization initiator in U.S. Pat. No. 2,448,828.

EXAMPLE 8

The following values for λ max in methylene chloride are obtained from the ultraviolet spectra of the compounds set forth:

|  | λ max, nm. | ε $M^{-1}CM^{-1}$ |
|---|---|---|
| Benzoin Methyl Ether (U. S. 2,448,828) | 248 | 12,400 |
|  | 280 | 1,000 |
|  | 330 | 286 |
| 4,4'-bis(methoxycarbonyl) benzoin methyl ether | 255 | 22,620 |
|  | 280 | 6,600 |
|  | 335 | 410 |

The compound of our invention demonstrated a greater absorptivity in the UV regions measured, indicating that it is a more effective absorber of the UV light used in the photocuring process.

The novel compounds of our invention, being diesters of dicarboxylic acids, are capable of being converted into polyesters by reaction with glycols such as ethylene glycol. Such polyesters are useful as photoinitiators as described hereinbefore and are especially useful in environments in which initiators of lower molecular weight might be fugitive, e.g., at high temperatures. The following examples illustrates the manufacture of such a polyester.

EXAMPLE 9

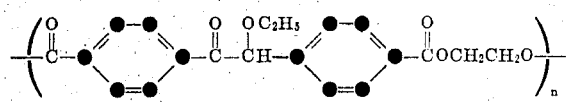

A stirred mixture of 0.1 g. titanium isopropoxide, 25 g. (0.065 mole) of 4,4'-bis(ethoxycarbonyl)benzoin ethyl ether, and 8.0 g. (.13 mole) of ethylene glycol were combined in a 3-necked reaction flask equipped with a thermometer, 4" Vigreux column and distillation head. The flask was placed in an oil bath and heated at 199°–212°C. for 2 hr. removing the ethanol as formed. The reaction mixture was placed under vacuum at (1.0 mm) and 212°–218°C. for 30 min. The mixture was cooled to 70°C. and the product transferred to a glass bottle. The product was light amber in color and set to a glass on cooling. Mol. wt. – 1146.

Although the invention has been described in considerable detail with particular reference to certain preferred embodiments thereof, variations and modifications can be effected within the spirit and scope of the invention.

We claim:

1. 4,4'-bis(alkoxycarbonyl)benzoin ethers of the formula:

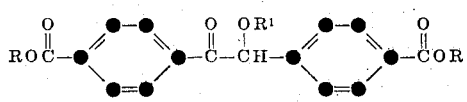

in which the substituents R are the same or different and are straight or branched chain alkyl of 1 to 10 carbons and the substituent $R^1$ is straight or branched chain alkyl of 1 to 10 carbons.

2. Compounds according to Claim 1 in which each of the substituents R and $R^1$ is alkyl of 1 to 4 carbons.

3. The compound according to Claim 2 in which the compound is 4,4'-bis(methoxycarbonyl)benzoin methyl ether.

4. The compound according to Claim 2 in which the compound is 4,4'-bis(ethoxycarbonyl)benzoin ethyl ether.

5. The compound according to Claim 2 in which the compound is 4,4'-bis(butoxycarbonyl)benzoin butyl ether.

6. The compound according to Claim 2 in which the compound is 4,4'-bis(methoxycarbonyl)benzoin isopropyl ether.

* * * * *